(12) United States Patent
Pimentel et al.

(10) Patent No.: US 8,625,951 B2
(45) Date of Patent: Jan. 7, 2014

(54) MODULAR SUPPORT SYSTEM FOR OPTICAL FIBER TRAYS

(75) Inventors: Nelson Goncalves Pimentel, Neuss (DE); Ulrich Lutterkordt, Wuppertal (DE); Nico Kubinski, Wuppertal (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/876,924

(22) PCT Filed: Aug. 23, 2011

(86) PCT No.: PCT/US2011/048764
§ 371 (c)(1),
(2), (4) Date: Mar. 29, 2013

(87) PCT Pub. No.: WO2012/047390
PCT Pub. Date: Apr. 12, 2012

(65) Prior Publication Data
US 2013/0214662 A1      Aug. 22, 2013

(30) Foreign Application Priority Data
Oct. 8, 2010   (EP) .................................... 10186950

(51) Int. Cl.
*G02B 6/00* (2006.01)
(52) U.S. Cl.
USPC ....................................................... 385/135
(58) Field of Classification Search
USPC ................................................ 385/134, 135
See application file for complete search history.

(56) References Cited

U.S. PATENT DOCUMENTS

| | | | |
|---|---|---|---|
| 4,884,862 A | 12/1989 | Kofod | |
| 5,100,221 A | 3/1992 | Carney | |
| 6,438,310 B1 | 8/2002 | Lance | |
| 6,764,220 B2 | 7/2004 | Griffiths | |
| 6,845,207 B2 | 1/2005 | Schray | |
| 2003/0103743 A1 | 6/2003 | Sun | |
| 2003/0123834 A1 | 7/2003 | Burek | |
| 2003/0202759 A1 | 10/2003 | Sun | |
| 2004/0197066 A1 | 10/2004 | Daoud | |
| 2007/0058918 A1* | 3/2007 | Trebesch et al. | 385/135 |
| 2007/0092195 A1* | 4/2007 | Solheid et al. | 385/135 |
| 2008/0138026 A1 | 6/2008 | Yow | |
| 2008/0240665 A1* | 10/2008 | Barth | 385/135 |
| 2009/0202213 A1 | 8/2009 | Griffiths | |
| 2011/0286712 A1* | 11/2011 | Puetz et al. | 385/135 |

FOREIGN PATENT DOCUMENTS

| | | |
|---|---|---|
| CN | 1421373 A | 6/2003 |
| EP | 0 735 394 A2 | 10/1996 |
| EP | 0 883 828 B1 | 6/2002 |
| EP | 1 166 161 B1 | 11/2003 |
| WO | WO 98/22842 | 5/1998 |
| WO | WO 2008/018453 | 2/2008 |
| WO | WO 2009/106874 | 9/2009 |

* cited by examiner

*Primary Examiner* — Sung Pak
(74) *Attorney, Agent, or Firm* — Janet A. Kling

(57) ABSTRACT

The invention comprises a modular support system (7) for optical fiber trays (10) comprising: at least one central module (21) for supporting the optical fiber trays, the central module being adapted to be positioned side-by-side with a plurality of central modules supporting the optical fiber trays, wherein the central module further comprises a fixing structure (34, 35) for attaching at least one additional fiber management module (41, 51) to the central module. The invention further comprises a kit of parts for a modular support system for optical fiber trays as well as an optical fiber organizer.

14 Claims, 13 Drawing Sheets

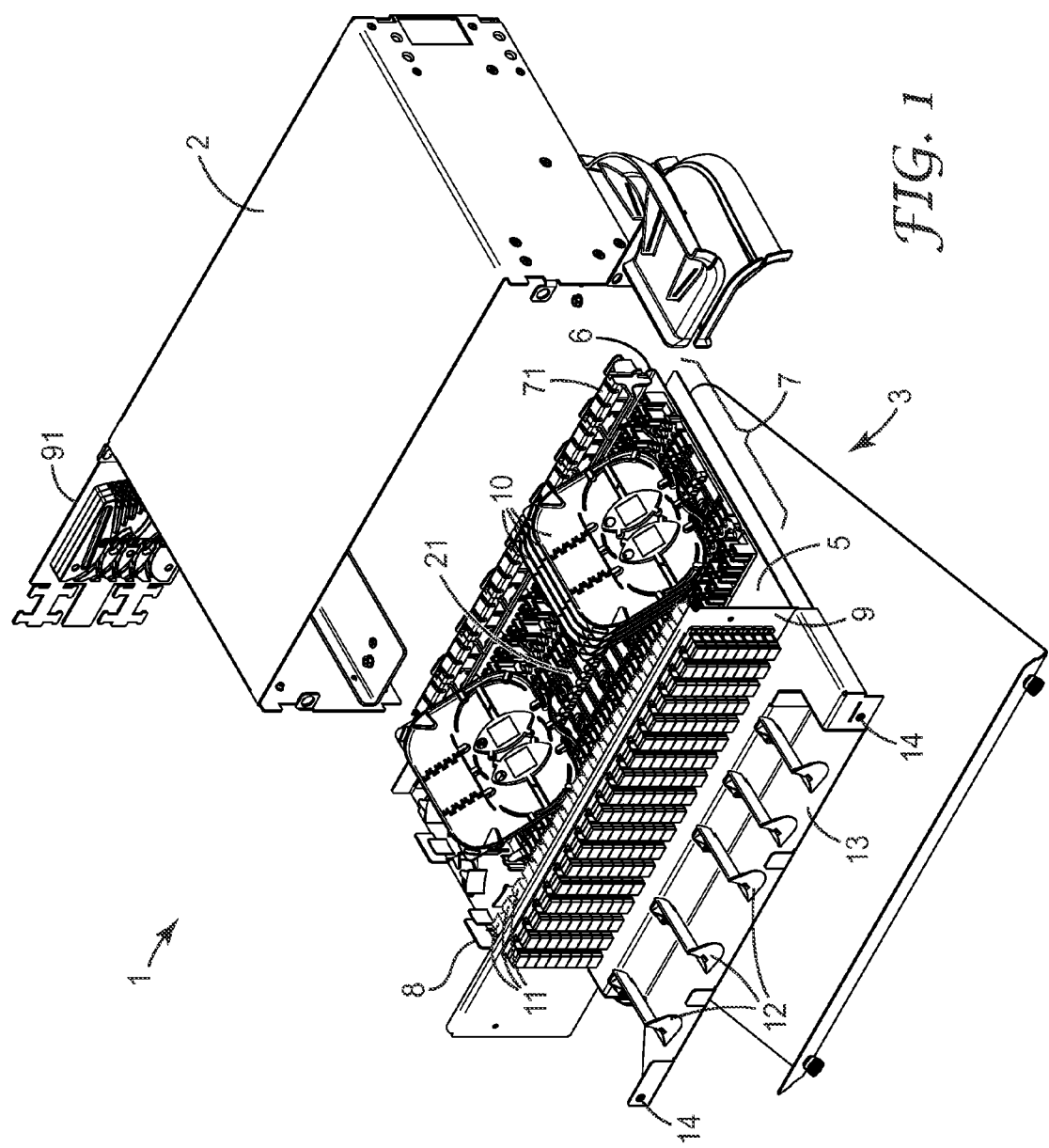

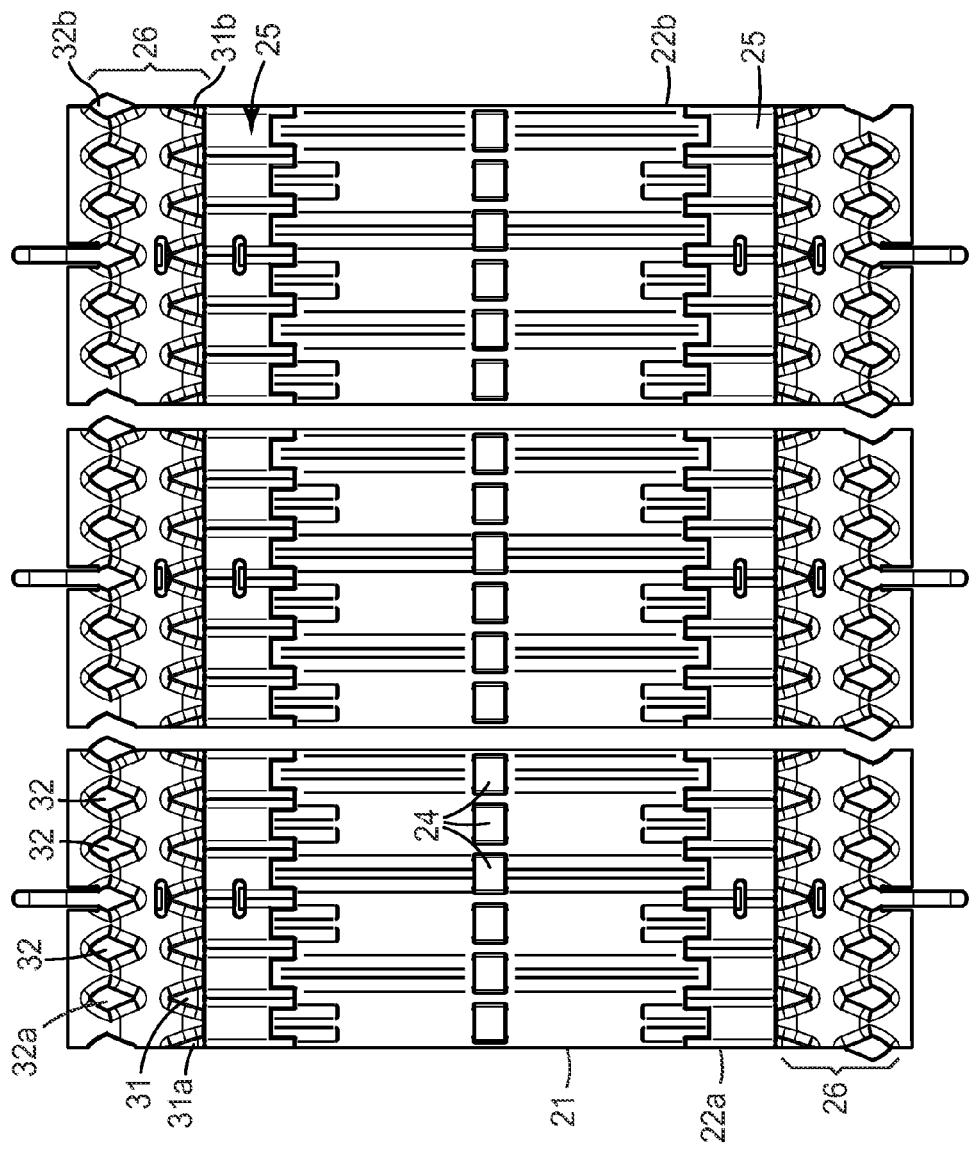

MODULAR SUPPORT SYSTEM FOR OPTICAL FIBER TRAYS

The invention relates to a modular support system for optical fiber trays, a kit of parts for a modular support system for optical fiber trays as well as to an optical fiber organizer with such a modular support system.

BACKGROUND OF THE INVENTION

Telecommunication cables are used for distributing all manner of data across vast networks. A telecommunication cable typically includes a bundle of individual telecommunication lines (either optical fibers or copper wires) that are encased within a protective sheath. As telecommunication cables are routed across data networks, it is necessary to periodically open the cable so that for example one or more telecommunication lines therein may be spliced, thereby allowing data to be distributed to other cables or "branches" of the telecommunication network. In distribution points of a telecommunications network it is also necessary to install organizers where the cables may be managed and connected to the necessary telecommunications infrastructure such as for example splitters etc.

Commonly, optical fiber organizers are arranged in racks that comprise optical fiber storage and/or splice trays mounted on support systems.

WO 2009/106874 discloses an optical fiber storage or management module for an optical distribution frame or rack for management of fiber cables, fibers and connections. The module comprises a housing and a drawer for a rack with at least one optical fiber storage tray and a support for supporting the storage tray(s).

WO98/22842 discloses an optical fiber organizer with a storage module. The storage module comprises a support plate for supporting a plurality of hinged optical fiber storage trays. The support plate is fixed to the storage module by a snap-fit. A plurality of support plates may be arranged side-by-side in the storage module, thereby forming a larger support plate. Each support plate comprises a central area and lateral routing areas, e.g. in the shape of several narrow channels or one big corridor.

There is a need to provide a flexible support system for optical fiber trays that can be adapted easily to different applications and different sizes of cable management systems. There is further a need for a flexible support system for optical fiber trays that allows of retrofitting cable management systems and adapting them to changing boundary conditions. There is also a need to provide a kit of parts for a modular support system for optical fiber trays and to provide an optical fiber organizer with the above mentioned properties.

SUMMARY

The invention comprises a modular support system for optical fiber trays comprising at least one central module for supporting the optical fiber trays, the central module being adapted to be positioned side-by-side with a plurality of central modules supporting additional optical fiber trays. According to the invention, the central module further comprises a fixing structure for attaching at least one additional fiber management module to the central module. The fixing structures according to the invention may be all kind of appropriate fixing structures that have the ability to attach two parts to each other or to position them adjacent to each other such that they can be easily detached from one another but stay side-by-side to each other during use of the support system. Examples for such fixing structures may be snap fit elements, friction fit elements, screws or gluing. In other words the system according to the invention is based on a central module. The size of the system may be adapted by choosing the appropriate number of central modules and positioning them side-by-side. Depending on the application, additional fiber management modules may be attached to the central modules. The fiber management modules may provide different kind of fiber management functions, thus it is possible to adapt the modular support system to all kind of different applications by choosing the appropriate fiber management module(s).

The modular support system according to the invention provides the advantage of being a flexible system with regard of its size and fiber management functions which may be adapted according to a great number of applications.

The central modules of the modular support system according to the invention may have an essentially planar structure and can be made out of plastic. The use of plastic has the advantage that the modules may easily and cost effectively manufactured such as for example by injection moulding. Possible plastic material that can be used are for example ABS, PC or PBT (acrylonitrile butadiene styrene, polycarbonate or polybutylene tereph).

The support system according to the invention may be used for standard optical telecommunication fibers, for example, fibers having a standard buffer cladding, or a fiber buffer cladding having an outer diameter being larger or smaller. The outer fiber jackets may be standard sizes, such as for example 1 mm, 2 mm, or 3 mm, etc. or they may be even less, such as for example 0.9 mm or 0.25 mm. The support system according to the invention may further be used for optical fiber ribbon cables, it may be used for single or multi fiber cables or even for patch cords.

According to another exemplary embodiment of the invention, the modular support system for optical fiber trays comprises recesses and projections cooperating with each other while central modules are positioned side-by-side. A first central module may have at least one recess that cooperates with a projection of a second central module that is positioned adjacent to the first support module. Such a structure has the advantage that the central modules that are positioned side-by-side are fixed relative to each other. During use of the system, it is important that the modules are not moved relative to each other since the fibers being managed on the system need a stable support. The recess and the projection may be configured such that the fixation between the first and the second central modules is a detachable fixation such as for example a snap-fit based fixation. It is also possible that the central modules may be fixed at each other in a non-detachable way such as for example by gluing, press-fitting or screwing. If the central module comprises a repetitive structure, such as for example a structure for guiding fibers or a structure for supporting fiber trays, the central module may be configured such that the structure is continuously set forth on central modules that are positioned adjacent each other. In other words, repetitive structures on central modules that are positioned side-by-side are arranged on the modules such that the structures continue over the plurality of central modules without any gap or break between them. The recesses and projections may function as keying-features that allow easy alignment and orientation of the central modules in a side-by-side manner.

According to a further exemplary embodiment of the invention, the central module comprises a plurality of hooks configured to engage with a latching mechanism of the optical fiber trays. Hooks are a commonly known element for attaching elements at each other, especially if it is intended to swivel or pivot one element relative to the other. Furthermore, hooks are easy to manufacture if the central module is produced by injection moulding. The hooks may be integrated into the design of the central module and therefore be one part with the central module. The hooks may be configured such that the optical fiber tray may be snap fitted to the central module. The hooks may also be part of the repetitive structure described above with the advantage that the trays may be arranged on the support system in a very space saving manner.

The modular support system according to the invention may comprise a central module with a bearing structure configured to support pivotal movement of the optical fiber trays relative to the central module. The bearing structure may have the shape of open channels with a semi circle cross section. The bearing structure may also be part of the repetitive structure described above.

The modular support system according to the invention may further comprise a central module with a guiding structure configured to direct optical fibers in more than one direction to and from the optical fiber trays. Such a structure provides flexibility in routing fibers on the support system without being limited to guide the fibers into a given direction. The guiding structure may provide multi-directional fiber channels that provide sufficient physical support to the fibers and assure the suitable bending radius of the fibers.

The modular support system according to the invention may provide a central module with a retaining bracket that extends over a lateral side of the support part for retaining optical fibers that are routed from or to the optical fiber trays or lengthwise along the support system. An additional retaining bracket may provide more physical support to the fibers that are routed over the support structure according to the invention. The retaining bracket may be configured as being one part with the central module with the advantage of being produced in one step with the central module or it may be configured as being two parts with the central module. The second alternative may have the advantage of an even more flexible and adaptable system, since the retaining bracket may only be installed when needed.

The modular support system according to the invention may further provide a central module having fixing structures for attaching a fiber management module. The fiber management module can be positioned on a bottom side of the central module. Such a configuration has the advantage that the top side of the central module may be used exclusively for routing and/or managing fibers as well as for supporting or holding optical fiber trays. It is also possible to position the fixing structures of the central module in other suitable areas of the central module, such as for example at lateral sides.

The invention also comprises a kit of parts for a modular support system for optical fiber trays comprising
at least one central module for supporting the optical fiber trays, the central module being adapted to be positioned side-by-side with a plurality of additional central modules supporting the optical fiber trays, wherein the central module further comprises fixing structures for attaching at least one additional fiber management module to the central module and
at least one additional fiber management module. Such a kit of parts offers the same advantages as the modular support system mentioned above.

According to one exemplary embodiment of the invention the kit of parts comprises a fiber management module with a c-shaped fiber corridor for guiding optical fibers. A c-shaped fiber corridor provides on one side sufficient protection for the fibers being routed through the corridor. On the other side it provides the possibility that fibers may enter or leave the corridor at any appropriate location since the corridor provides one open side. The open side of the corridor may face the central module when the fiber management module is attached to the central module. It is of course also possible to have fiber management module with a L-shaped fiber corridor.

The fiber corridor may be oriented such that optical fibers may be routed lengthwise to the support system, wherein each corridor can route optical fibers to either end of the support system and provide optical fibers access to individual splice trays mounted on the support system. This may for example be the case if the corridor is oriented with an angle of approximately 90° relative to a pivot axis of the fiber optic trays.

The kit of parts may further comprise an additional fiber management module which comprises a strain relief element fixing structure with parallel sidewalls and snap elements, e.g. noses, for holding strain relief elements. Instead of the snap elements for holding the strain relief elements, the additional fiber management module may also comprise other common fixing structures, such as for example tube holders for tubes protecting fibers as well as universal fixing elements such as for example cable-ties.

The kit of parts according to the invention may have a fiber management module with a strain relief fixing structure, wherein the strain relief fixing structure is configured such that the strain relief elements are positioned in a staggered way on the additional fiber management module. Such an arrangement provides a space saving possibility of positioning a strain relief element on a fiber management module.

According to another embodiment of the invention the fiber management module comprises a flat section carrying a fixing structure corresponding with the fixing structure of the central module for attaching the additional fiber management modules to the central module. The flat section provides a space saving possibility of being positioned under the central module and cooperates with the fixing structures of the central module.

The invention further includes an optical fiber organizer comprising a housing, a drawer slidable mounted in the housing and a modular support system for optical fiber trays as described above mounted in the drawer or a kit of parts for a modular support system for optical fiber trays as described above.

BRIEF DESCRIPTION OF THE DRAWINGS

The invention will now be described in more detail with reference to the following Figures exemplifying particular embodiments of the invention:

FIG. 1 is a perspective, exploded view of an optical fiber organizer according to the invention;

FIG. 5b is a top view of a plurality of central modules in a side-by-side arrangement;

DETAILED DESCRIPTION

Figure 2A:
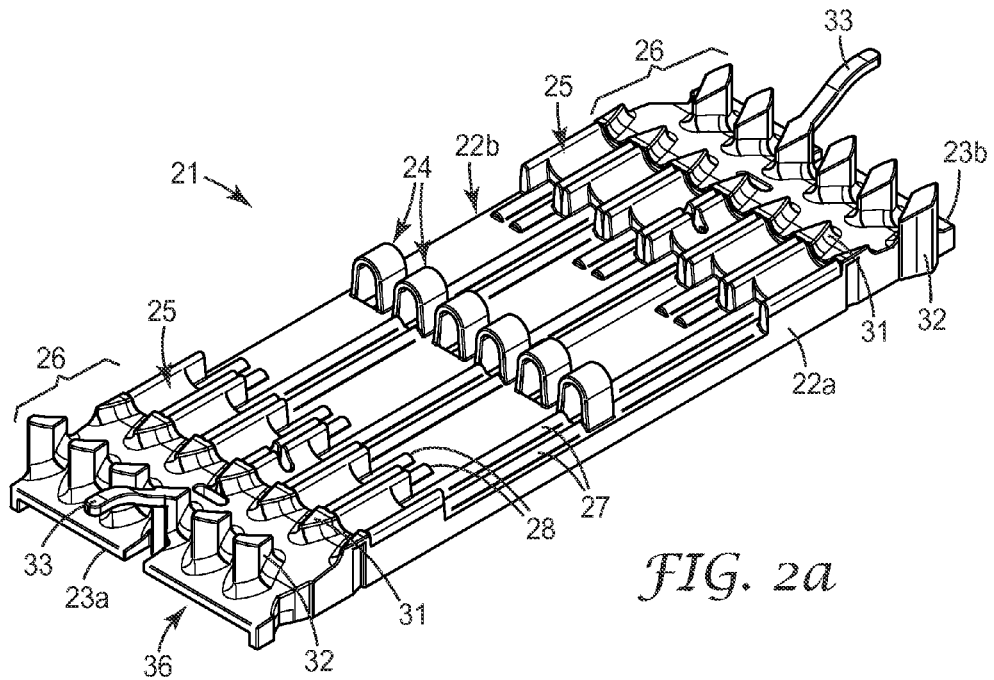
FIG. 2a is a perspective view of a central module of a modular support system for optical fiber trays according to the invention.

Herein below various embodiments of the present invention are described and shown in the drawings wherein like elements are provided with the same reference numbers. Directional terms such as "top," "bottom," "right," "left," and others are used with reference to the orientation of the Figure(s) being described.

FIG. 1 is a perspective exploded view of an optical fiber organizer 1. The optical fiber organizer 1 may be part of an optical fiber distribution frame or rack for the management of optical fiber cables, optical fibers and optical fiber connections. The optical fiber organizer 1 comprises a housing 2 and a drawer 3, that is slidably arranged in the housing 2 and enters the housing 2 at its front wall. The housing comprises a rear side wall that is positioned opposite the front wall. It further comprises two parallel side walls that are arranged perpendicular to the front and the rear side wall. The drawer 3 has a two level structure, a first level 4, e.g. a lower level, that provides an area for slack storage of entering cables and a second level 5, e.g. an upper level, that is configured to carry a support system 7 for optical fiber trays. Fiber can be routed from one level to the other across a rear end 6 of the drawer 3. For providing a safe guidance for these fibers into the drawer, the fibers may be guided through fiber-tubes fitted in fiber-tube guide elements 71. Several of such fiber-tube guide elements 71 are attached to the rear end 6 of the drawer. A fiber-tube guide element 71 is described in detail with reference to FIGS. 11 and 12.

Fibers that are managed in the optical fiber organizer 1 may enter the housing 2 through an opening (located next to a fan out element 91) in one of its side walls. A detailed description of a fan out element 91 will follow with reference to FIGS. 14 and 15. Through the opening they may be lead onto the first level 4 of the drawer, the slack storage level, using fiber-tubes to protect them. From the first level 4, the fibers may further be lead over the rear end 6 of the drawer 3 onto the second level 5, using the fiber-tube guide elements 71, that will be described with reference to FIGS. 11 to 13. The fibers enter the second level 5 at discrete points—predetermined by the geometry of the fiber-tube guide elements 71 along the length of the drawer 3. From there the fibers may directly enter the modular support system 7 according to the invention, that is arranged in the centre of the second level 5 of the drawer 3, where they may be spliced, connected etc. on optical fiber trays 10. The modular support system 7 extends from the left side of the second level 5 of the drawer 3 to a header 8, which is positioned at the right side of the drawer 3 and may, for example, be used for routing fibers into another direction. The fibers may leave the modular support system 7 on the opposite side, that is the side that faces the front end of the second level 5.

The front end of the second level 5 of the drawer 3 can be in the form of a patch panel 9 providing space for a plurality of optical fiber connectors 11. Terminated cables (not shown) from outside the drawer 3 can be connected to optical connectors 11 by fiber connector couplings in the patch panel 9. The terminated cables may be guided over a flat cable holder 13 that is arranged in the same plane as the second level 5 of the drawer 3 and through a series of five bar-shaped cable guides 12, having a half-moon shaped cross section, that are arranged in a row extending parallel to the cable holder 13. The radii of the half-moon shaped cable guides 12 are selected such that the minimum bend radius of the cables is maintained. It is also possible to arrange more or less than five cable guides 12 in front of the drawer 3.

According to the invention the support system 7 for optical fiber trays is a modular support system. That means that the support system 7 according to the invention comprises several different modules. These modules may be attached to each other or may be positioned next to each other such that the whole support system for optical fiber trays can be adapted to a plurality of applications. FIG. 2a is a perspective view of a central module 21, of one exemplary embodiment of a modular support system 7 for optical fiber trays according to the invention. A top view of the central module is shown in FIG. 5a. In an exemplary aspect the central module 21 is a substantially flat element with a rectangular shape. It comprises two parallel first sides 22a and 22b adapted to be positioned next to another central module 21 as well as two parallel second sides 23a and 23b adapted to be positioned next to or fixed to an additional fiber management module 41, 51 (such as for example shown in FIG. 3 and FIG. 4). The first sides 22a and 22b are longer than the second sides 23a and 23b and the first sides 22a and 22b are arranged perpendicular to the second sides 23a and 23b. The top side of the central module 21 comprises several structures that will be described in detail below.

In the middle of the top side of the central module 21, a row of hooks 24 for attaching the optical fiber trays 10 is arranged. In the embodiment shown in FIG. 2a, the central module 21 comprises a row of six hooks 24. The hooks 24 are arranged such that the optical fiber trays 10, when fixed to the central module 21, are oriented parallel to the first sides 22a and 22b. The hooks 24 may be designed as snap fit elements to provide a detachable fixing element. They may also be designed such that an optical fiber tray 10 may be attached once at the central module 21 but not detached again.

Figure 2B:
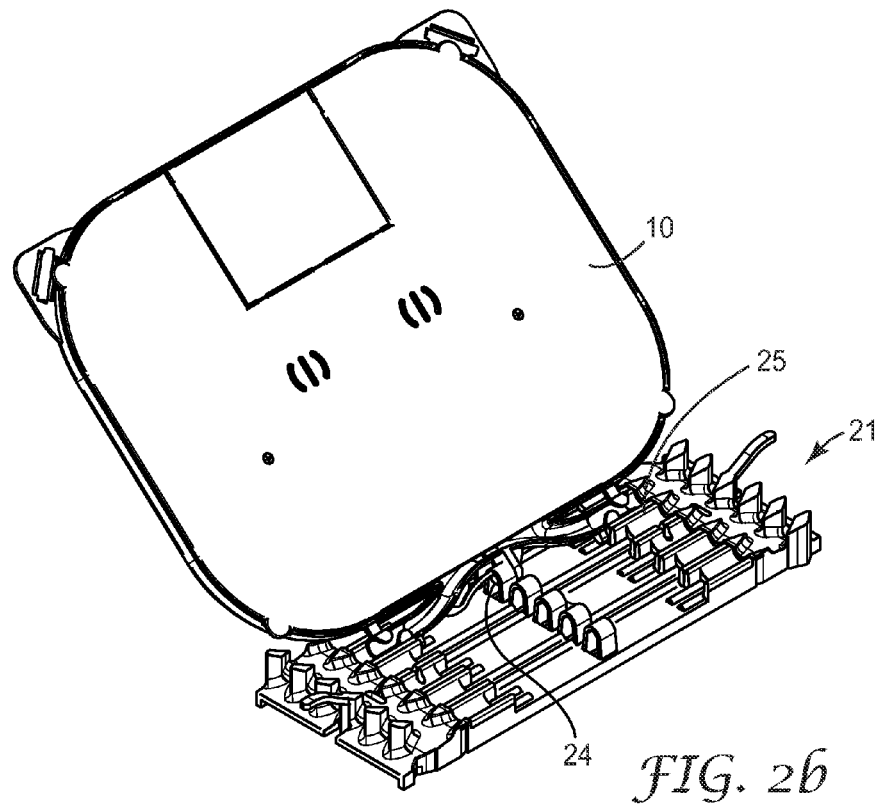
FIG. 2b is a perspective view of the central module of FIG. 2a with an optical fiber tray.

The structures on the top side of the central module 21 are arranged symmetrical relative to an axis through of the row of hooks 24, thus only one half of the structures will be described herein. With a certain distance from the hooks 24 the central module 21 comprises a bearing structure 25. The bearing structure 25 has the shape of six parallel channels, having a semicircular cross section. This structure 25, especially the orientation of the channels, can also be seen in FIG. 5a. The channels function as bearings for outer edges of the optical fiber trays 10. Between the bearing structures 25 and the hooks 24 in the middle of the central module 21 parallel protrusions 27 and 28 are arranged which help keeping the fiber trays fixed in a certain position, for example with an angle of 90° or 45°. FIG. 2b is a perspective view of the central module of FIG. 2a with an optical fiber tray 10 that shows how the tray 10 is fixed over the hooks 24 at the support structure and how the tray 10 interacts with the bearing structures 25.

Adjacent the channel shaped bearing structure 25, the central module 21 provides a first fiber guide structure 26, constructed such that fibers may be lead into three different directions. For example, fibers that are coming from an optical fiber tray 10 may be lead in a direction parallel to the channels of the bearing structure 25 (straight direction, see arrow X), the fibers may be lead to the right (indicated by arrow A) and the fibers may be lead to the left (indicated by arrow B). This is achieved by two rows of fiber guiding elements 31 and 32. Those fiber guiding elements 31 and 32 may also be seen in FIG. 5. The guiding elements 31 in the first row—that is the row that is positioned closer to the row of hooks 24—are triangular shaped. They are oriented such that one corner of the triangle points towards to the second sides 23a and 23b of the central module 21. The flat side of the triangle that is opposite of the corner facing towards the second sides 23a and 23b touches the channels of the bearing structure 25 such that one triangle is arranged between two of the bearing structure channels and touches the side walls of those two channels. Thus, fibers coming from optical fiber trays 10 may be lead between two of the triangles of the guiding elements 31. The guiding elements 32 in the second row have a trapezoidal or diamond shape and are arranged such that one corner of their corner points to the corner of the guiding elements 31 facing towards the second sides 23a and 23b. The guiding elements 31 and 32 are arranged in a non-staggered way relative to each other. Thus, fibers coming from optical fiber trays may be led between two triangles of the guiding elements 31—as mentioned above—and they may be led between two trapezoids of the guiding elements 32. This is the above mentioned straight guiding direction. A fiber coming from or going to an optical fiber tray 10 passing through two triangular shaped guiding elements 31 of the first row may also be lead to the left or to the right by passing through two guiding elements 32 of the second row as indicated by the arrows A and B, respectively in FIG. 5a. It is also possible to direct the fiber in a straight direction as indicated by the arrow X. The side walls of the guiding elements 31 and 32 have rounded bottom edges leading into the surface of the central module 21. Thereby the repetitive structure on the surface of the central modules 21 may be continued without a gap over the length of a plurality of central modules 21 positioned side-by-side.

When looking at FIG. 5a, the first row of guiding elements 31 extends from the first side wall 22a to the opposite side wall 22b, starting with half a guiding element 31a at the first side wall 22a and ending with a corresponding second half of a guiding element 31b. The second row of guiding elements 32 also extends from the first side wall 22a to the opposite side wall 22b. It starts with a recess and then with a complete guiding element 32a and it ends with a complete guiding element 32b that extends over the side wall 22b of the central module 21. The guiding element 32b that extends over the side wall 22b of a first central module 21 may be positioned in a recess next to a guiding element 32a of a second central module 21 that is placed side-by-side to the first central module 21 (as can be seen in FIG. 5b). Such the guiding element 32b functions as a keying element that helps to position two central modules 21 relative to each other. Since the central module 21 has a symmetric geometry it does not matter which of the two sides 22a or 22b of two central modules 21 are placed next to each other.

The central module 21 further provides a retaining bracket 33 at the middle of each second side 23a and 23b for retaining fibers that are routed on a lateral side of the central module 21, e.g. in an additional fiber management module as will be described with reference to FIGS. 3 and 4. The retaining brackets 33 each extend from the middle of a fiber guide element 32 over the second sides 23a and 23b. Each bracket has a shape like a hook or nose and may have any other appropriate shape. As can be seen in FIG. 2a the central module 21 comprises a recess 36 at its second sides 23a and 23b (only the one on the side 23a is shown in FIG. 2a). This recess 36 may accommodate parts of additional fiber management modules as will be described in detail with reference to FIG. 9.

Figure 3:
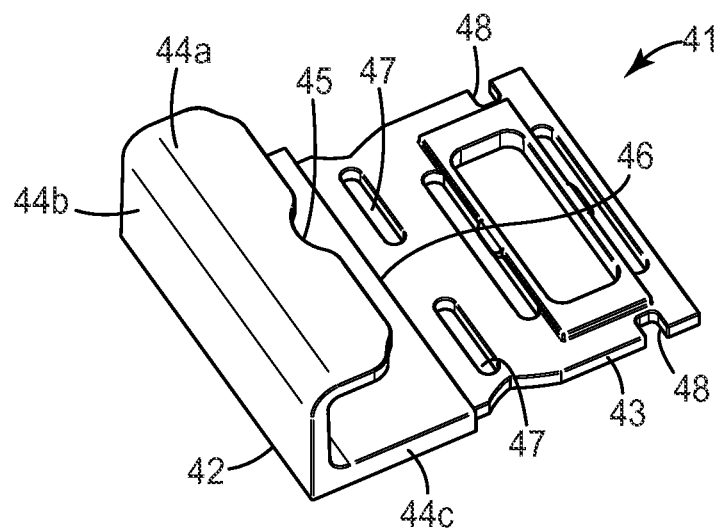
FIG. 3 is a perspective view of one embodiment of an additional fiber management module of a modular support system according to the invention.
Figure 6:
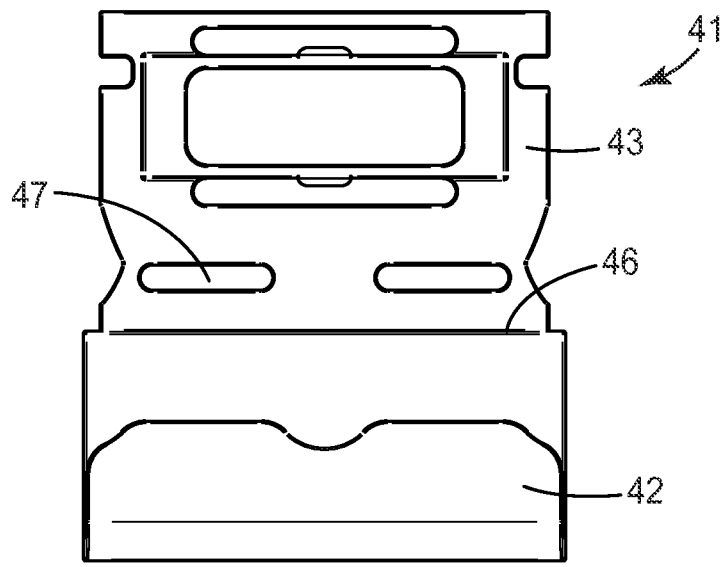
FIG. 6 is a top view of the additional fiber management module of FIG. 3.

FIG. 3 is a perspective view of an exemplary embodiment of an additional fiber management module according to the invention—a fiber routing module 41. FIG. 6 shows a top view of the fiber routing module 41 from a top view. The fiber routing module 41 comprises essentially two parts: a c-shaped fiber corridor 42 for routing fibers e.g. from and to optical fiber trays 10 that may be attached to the central module 21 and a flat connection part 43 for fixing, attaching or positioning the fiber routing module 41 to the central module 21. The fiber routing module 41 is adapted to be positioned next the central module 21 adjacent its second sides 23a and/or 23b. The length of the c-shaped fiber corridor 42 corresponds to the length of those second sides 23a and 23b of the central module 21. The c-shaped fiber corridor 42 comprises an upper shoulder 44a, a rear shoulder 44b and a lower shoulder 44c. The upper shoulder 44a and the lower shoulder 44b are oriented parallel to each other, the rear shoulder 44b joins the upper shoulder 44a and the lower shoulder 44c with each other and is oriented perpendicular to both. The upper shoulder 44a has a recess 45 positioned in its middle facing the central module 21, when both modules are fixed at each other. The recess 45 corresponds to the fiber retaining bracket 33 of the central module 21 and allows pushing fibers through the gap between the c-shaped corridor 42 and the retaining bracket 33 of the central module 21 into the corridor 42. The c-shaped fiber corridor 42 leads to the second flat connection part 43 of the fiber routing module 41 over an abutment 46 functioning as an abutment for the central module 21. The width of the flat connection part 43 is slightly smaller than the length of the c-shaped corridor 42. The flat connection part 43 comprises two elongated holes 47 as well as two u-shaped recesses 48 for fixing the fiber routing module 41 to the central module 21 as will be described in detail with reference to FIG. 9.

Figure 4:
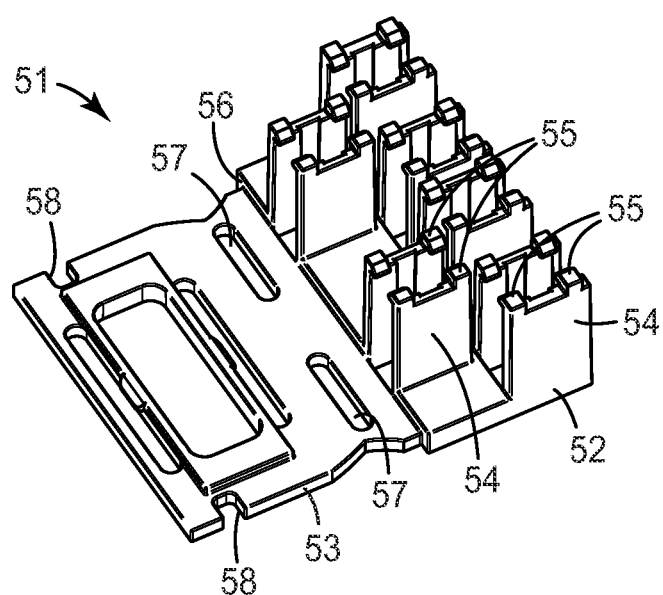
FIG. 4 is a perspective view of another embodiment of an additional fiber management module of a modular support system according to the invention.
Figure 5A:
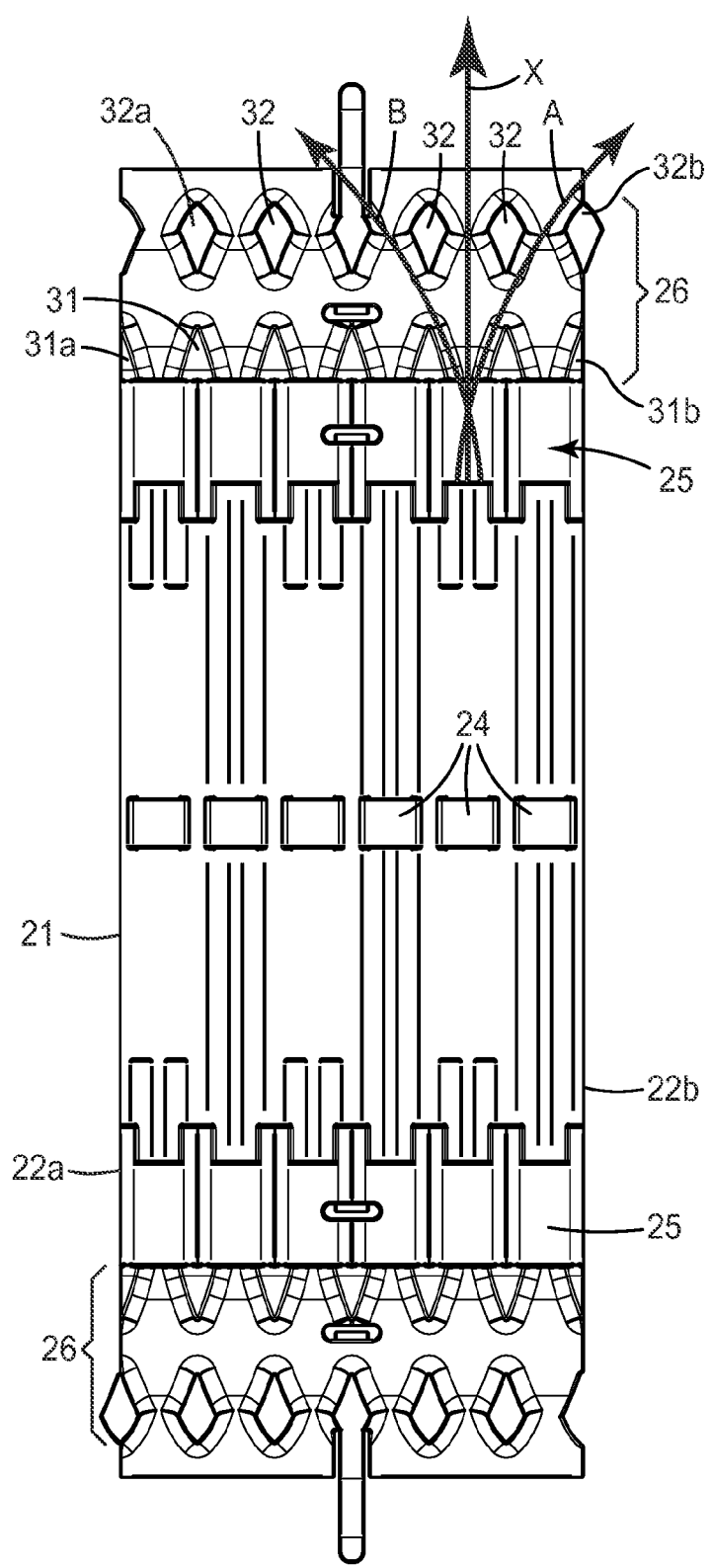
FIG. 5a is a top view of the central module of FIG. 2.
Figure 7:
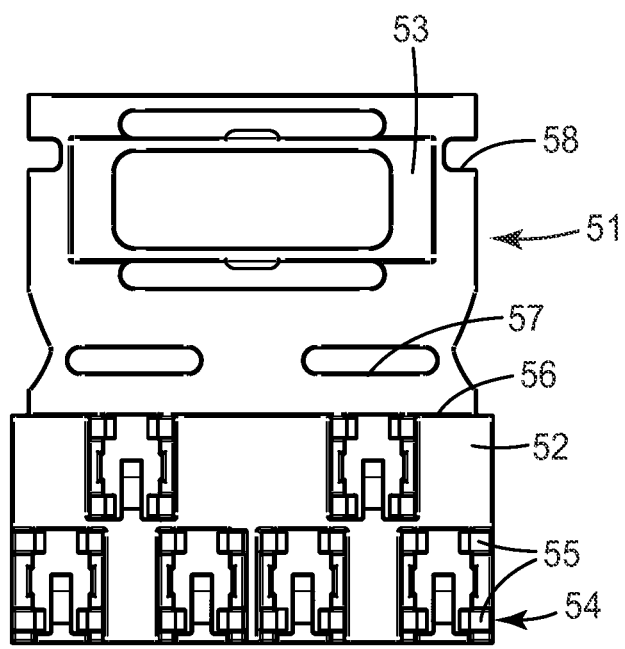
FIG. 7 is a top view of the additional fiber management module of FIG. 4.

FIG. 4 is a perspective view of exemplary embodiment of an additional fiber management module a strain relief module 51. The same element is shown in FIG. 7 from a top view. The strain relief module 51 comprises essentially two parts: a receptacle part 52 for strain relief elements (shown in FIG. 10) and a flat part 53 for fixing, attaching or positioning the strain relief module 51 to the central module 21. The strain relief module 51 is adapted to be positioned next the central module 21 adjacent its second sides 23a and/or 23b in a fashion similar to fiber routing module 41. The width of the receptacle 52 corresponds to the length of those second sides 23a and 23b of the central module 21. The receptacle part 52 provides a fixing structure for strain relief elements comprising a plurality of parallel walls 54 extending perpendicular from the main surface of the receptacle part 52 of the strain relief module 51 with noses 55 at the upper end of the walls 54 for retaining the strain relief elements. The walls 54 are arranged such that the strain relief elements 61 (FIG. 10) may be positioned onto the strain relief module 51 in a staggered way whereby two walls 54 are needed to hold one strain relief element 61. The receptacle part 52 leads to the second flat part 53 of the strain relief module 51 over an abutment 56 functioning as an abutment for the central module 21. The width of the flat part 53 is slightly smaller than the length of the receptacle part 52. The flat part 53 comprises two elongated holes 57 as well as two u-shaped recesses 58 for fixing the strain relief module 51 to the central module 21 as will be described in detail with reference to FIG. 9.

Figure 8A:
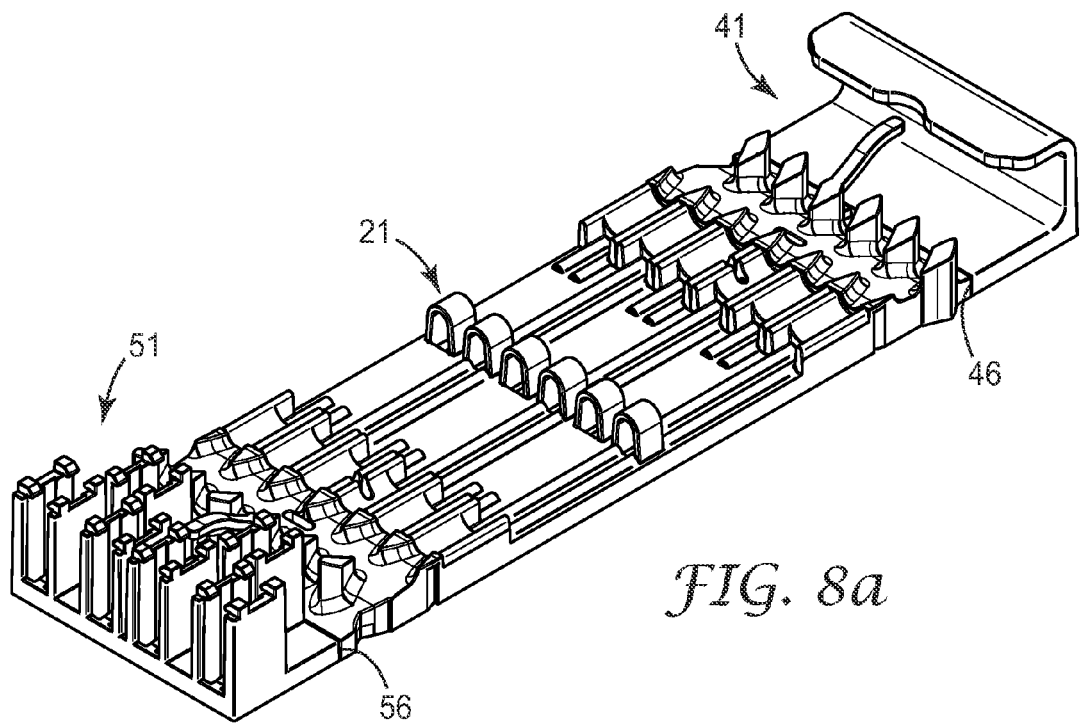
FIG. 8a is a perspective view of one embodiment of a modular support system according to the invention in an at least partially assembled state.
Figure 8B:
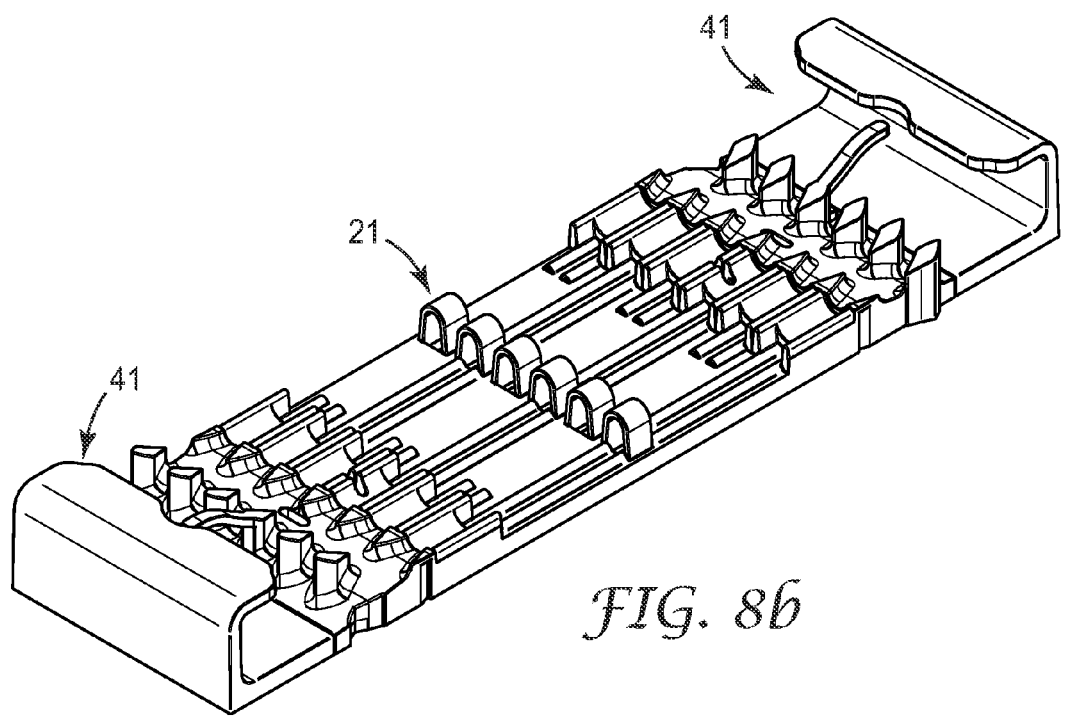
FIG. 8b is a perspective view of another embodiment of a modular support system according to the invention in an at least partially assembled state.
Figure 8C:
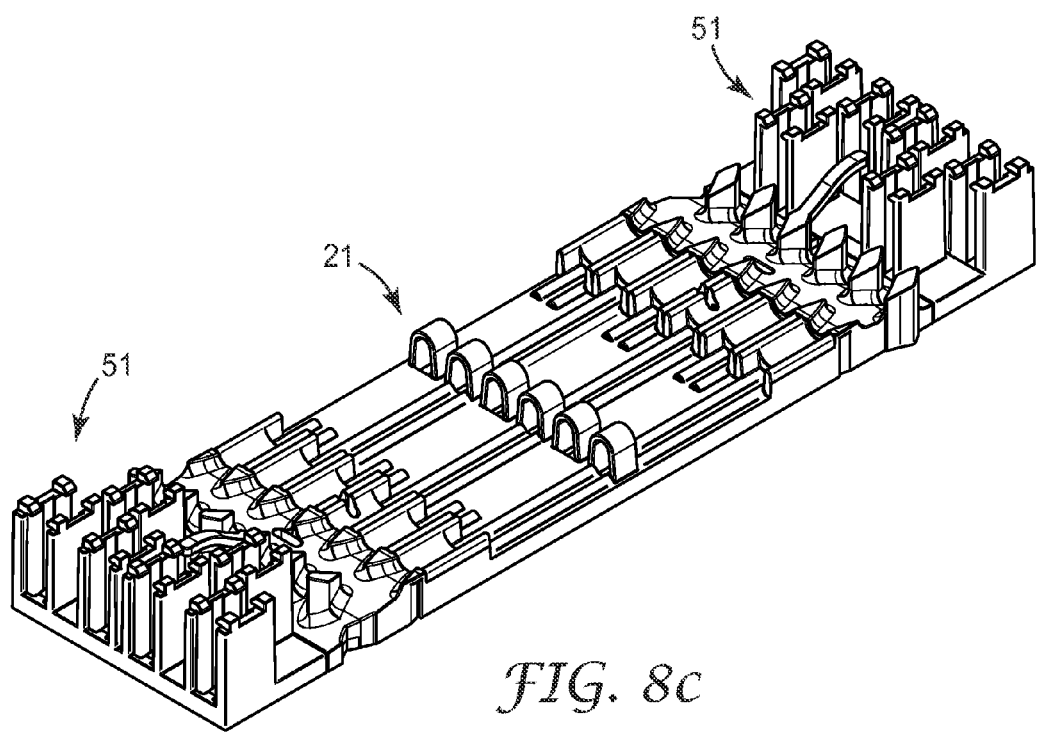
FIG. 8c is a perspective view of a further embodiment of a modular support system according to the invention in an at least partially assembled state.

FIGS. 8 a, b and c are perspective views of different embodiments of the modular support system 7 according to the invention. The Figures all show a central module 21 in the middle and different exemplary possible arrangements of additional cable management modules attached to the central module 21, e.g. as in FIG. 8a a strain relief module 51 on the left side and a fiber routing module 41 on the right side. Of course it is also possible to attach a strain relief module 51 on the right side and a fiber routing module 41 on the left side. In FIGS. 8b and 8c two identical fiber management modules are attached to the central module 21. In FIG. 8b two fiber routing modules 41 are attached to the central module 21. In FIG. 8c two strain relief modules 51 are attached to the central module 21. According to the invention several modules as shown in FIGS. 8a to 8c may be positioned next to each other (side-by-side) thereby adapting the length of the modular support system 7 according to the invention. It is of course also possible to attach other fiber management modules as shown in this application.

Figure 9:
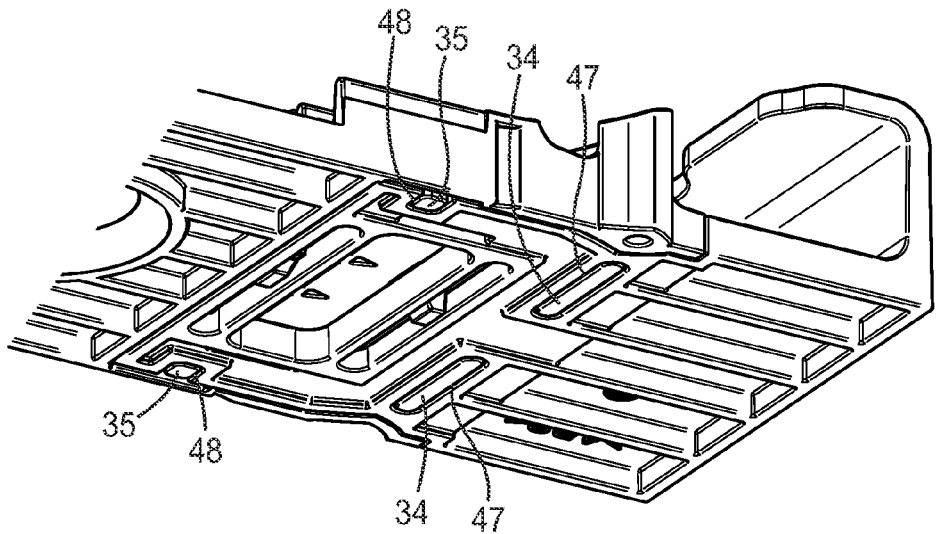
FIG. 9 is a perspective bottom view of the fixing structures of a central module and an additional fiber management module according to the invention.

FIG. 9 is a perspective view of the fixing structures of a central module 21 and an additional fiber management module—here a fiber routing module 41—according to the invention from the bottom side. This view shows how the two parts are fixed relative to each other. The central module 21 comprises two elongated protrusions 34 corresponding to the elongated holes 47 of the fiber routing module 41. The central module 21 further comprises two essentially round protrusions 35 corresponding to the two u-shaped recesses 48 of the fiber routing module 41. For fixing the fiber routing module 41 relative to the central module 21, the protrusions 34 and 35 of the central module 21 may be positioned in the holes 47 and recesses 48 of the fiber routing module 41. Holes 47, recesses 48 and protrusions 34 and 35 may be designed such that the connection between the two modules is a detachable snap-fit connection. They also may be designed such that the connection is a loose one which only holds the two parts in a relative position next to each other but does not really fix the two modules at each other. Any other appropriate possibilities to fix the two modules at each other may be used as well, such as for example gluing, clipping or clamping, etc.

Figure 10:
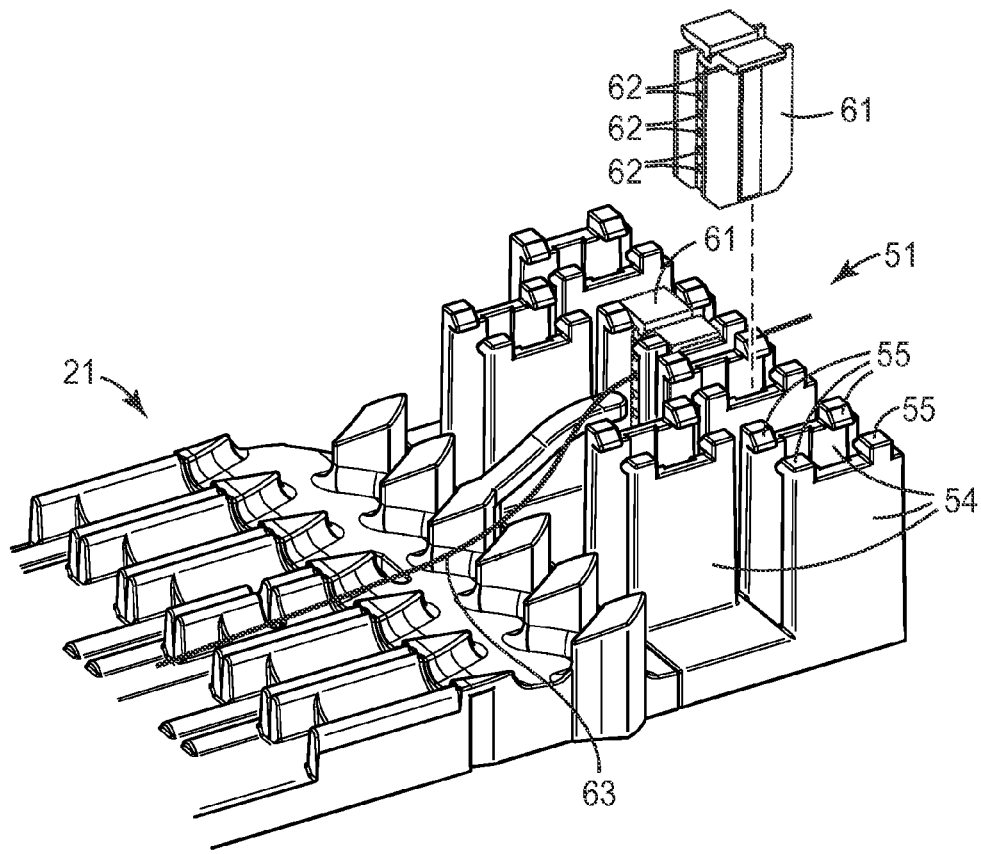
FIG. 10 is a perspective view of the additional fiber management module of FIGS. 4 and 7 with a strain relief element.

FIG. 10 is a perspective view of a central module 21 with a strain relief module 51 with one strain relief element 61 positioned onto the strain relief module 51 and another positioned over the strain relief module 51. The strain relief element 61 comprises a plurality of holes 62 (here six holes) in a row, each hole 62 configured to hold one fiber and providing strain relief to the sleeve of the fiber. FIG. 10 shows one fiber 63 that is being led through the strain relief element 61 that is positioned onto the strain relief module 51. Each strain relief element 61 may be positioned between two parallel walls 54 that provide holding noses 55 at their upper end. The walls 54 are arranged in a staggered way. Such an arrangement provides a space saving manner of positioning strain relief elements 61 onto the strain relief module 51. The fibers that are being led through the strain relief element 61 may go through or come from the fiber trays 10 supported by the support system 7.

Figure 11:
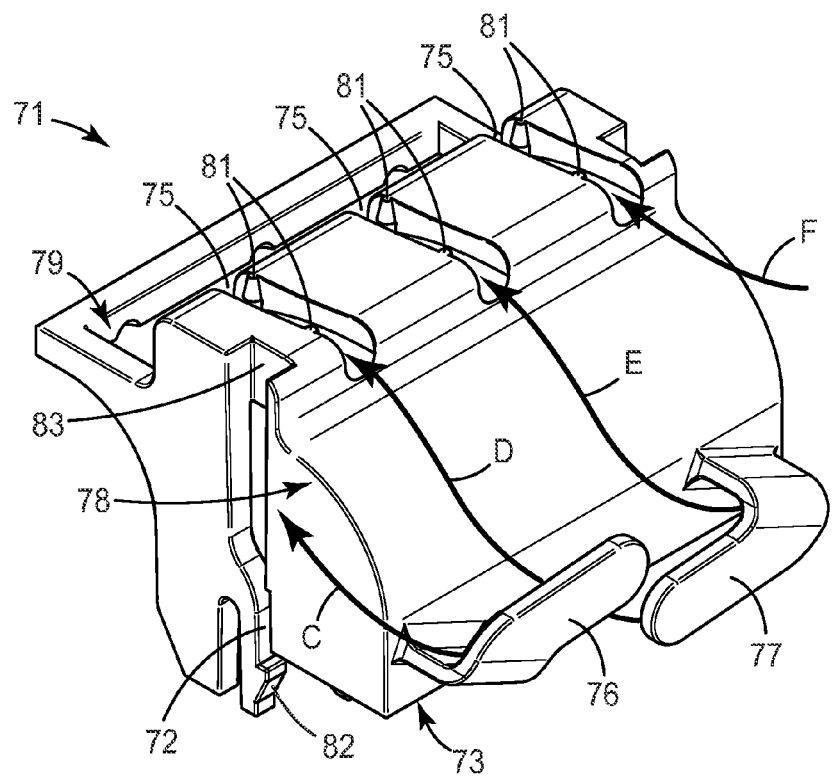
FIG. 11 is a perspective view of a fiber-tube guide element from one side.
Figure 12:
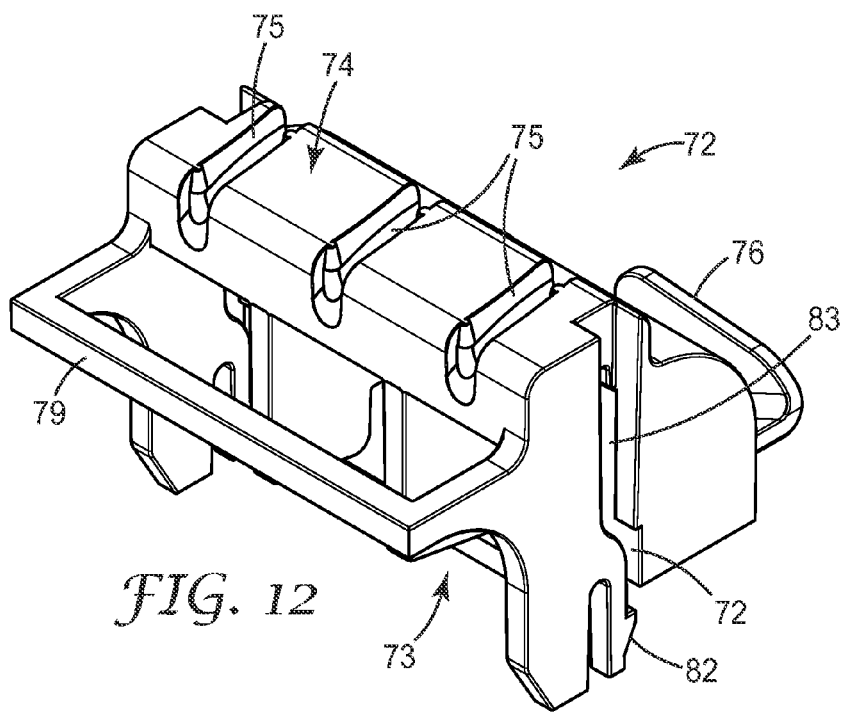
FIG. 12 is a perspective view of the fiber-tube guide element of FIG. 11 from the opposite side.

FIG. 11 is a perspective view of a fiber-tube guide element 71 from a first side. FIG. 12 shows the same fiber-tube guide element 71 from the opposite side. The fiber-tube guide element 71 may be positioned on the rear end 6 of the drawer 3 (see FIG. 1) for guiding fibers being stored on the first slack storage level 4 to the second (upper) level 5. The fibers being stored on the first slack storage level 4 may be routed trough tubes (not shown in the drawings). Several fiber-tube guide elements 71 may be positioned next to each other (side-by-side) along the rear end 6 of the drawer 3 providing fibers access to the upper level 5 at discrete points along the length of the drawer. For that purpose the fiber-tube guide element 71 provides a slot 72 for receiving the rear end 6 of the drawer 3. A notch 82 fixes the fiber-tube guide element 71 onto holes (not shown) in the rear end 6 of the drawer 3. The fiber-tube guide element 71 is detachable fixed to the rear end 6 of the drawer 6.

The fiber-tube guide element 71 has a block-shaped body with a lower side 73 and a upper side 74. The open ends of the slots 72 for fixing the fiber-tube guide element 71 to the rear end 6 of the drawer 3 (FIG. 1) are facing the lower side 73 of the fiber-tube guide element 71. The upper side 74 provides three parallel channels 75 for receiving fiber tubes (not shown). Each channel 75 provides two little notches one on each side of the channel 75 for fixing the tubes to the channel 75. The tubes may also be held into the channels 75 by any other appropriate means, such as for example by gluing.

The side of the fiber-tube guide element 71 which can be seen in FIG. 11 is the side that faces the rear side of the drawer 3 in FIG. 1 and the side of the fiber-tube guide element 71 which can be seen in FIG. 12 is the side that faces the inside of the drawer 3 of FIG. 1 with the support system 7 according to the invention. The rear side of the fiber-tube guide element 71 in FIG. 11 provides a rounded surface 78. The radius of the surface 78 is selected such that the minimum bend radius of fibers being lead through tubes is considered. This may be important because of the fiber-tube guide element 71 being positioned at the rear end 6 of the drawer 3 which may be moved relative to its housing 2 thereby pulling at fibers that are lead from the storage level 4 to the upper level 5 of the drawer 3. The side of the fiber-tube guide element 71 shown in FIG. 11 provides two flat L-shaped tube-holders 76 and 77. The short legs of the holders 76 and 77 are fixed to the fiber-tube guide element 71 and the long legs are facing each other thereby providing retention for fiber-tubes going to the channels 75. The short legs of the holders 76 and 77 are arranged parallel to each other but angled for example relative to the upper side 74 of the fiber-tube guide element 71. This arrangement provides the possibility of smoothly guiding fibers from, for example, a horizontal orientation the fibers might have while being stored on the storage level 4 to an orientation they need to have for being guided through the channels 75 to the support system 7 according to the invention. The arrows C, D, E and F indicate possible ways a fiber-tube might be guided along the fiber-tube guide element 71. The arrows D and E indicate ways of fiber-tubes that are held by holders 76 and 77 and guided through channels 75 of the same fiber-tube guide element 71. The arrows C and F indicate ways of fiber-tubes that are held by holders 76 and 77 from other fiber-tube guide elements 71 (not shown in FIGS. 11 and 12) than the channels they are guided through.

On the opposite side, that can be seen in FIG. 12 the fiber-tube guide element 71 provides a fiber retainer 79. The retainer 79 extends over the whole length of the fiber-tube guide element 71 and is connected on both sides with the fiber-tube guide element 71. The fiber-tubes that are being guided by the fiber-tube guide element 71 may end as soon as they have reached the upper side 74, e.g. the end of the channels 75 facing the interior of the drawer 3. The retainer 79 only retains fibers and no fiber-tubes. The fibers being retained by the fiber retainer 79 may directly be led to the support system 7 according to the invention, e.g. through a strain relief element 61 of a strain relief module 51 and from there onto a fiber tray 10.

Figure 13:
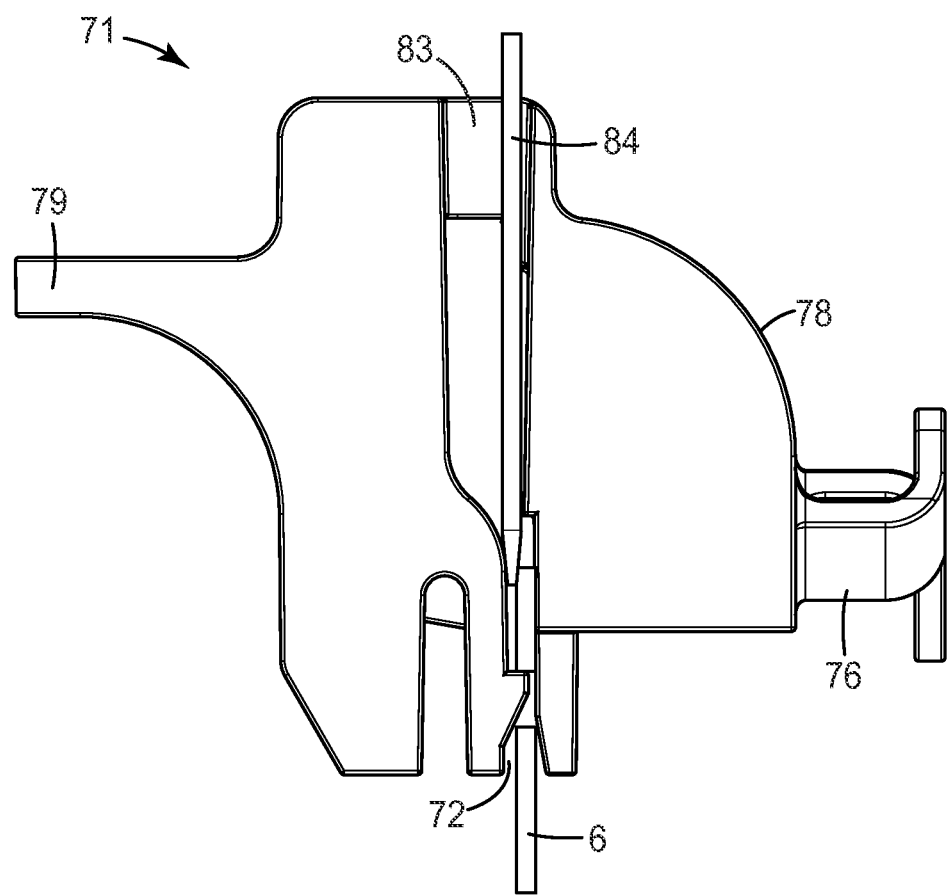
FIG. 13 is a side view the fiber-tube guide element of FIGS. 11 and 12.

FIG. 13 is a side view of the fiber-tube guide element 71 with the slot 72 on its lower side engaging over its notch 82 with the rear side 6 of the drawer 3. The slot 72 is accessible from above through an opening 83. A tool 84 may be inserted through the opening 83 for opening the engagement of the notch 82 with the rear side 6 of the drawer 3.

Figure 14:
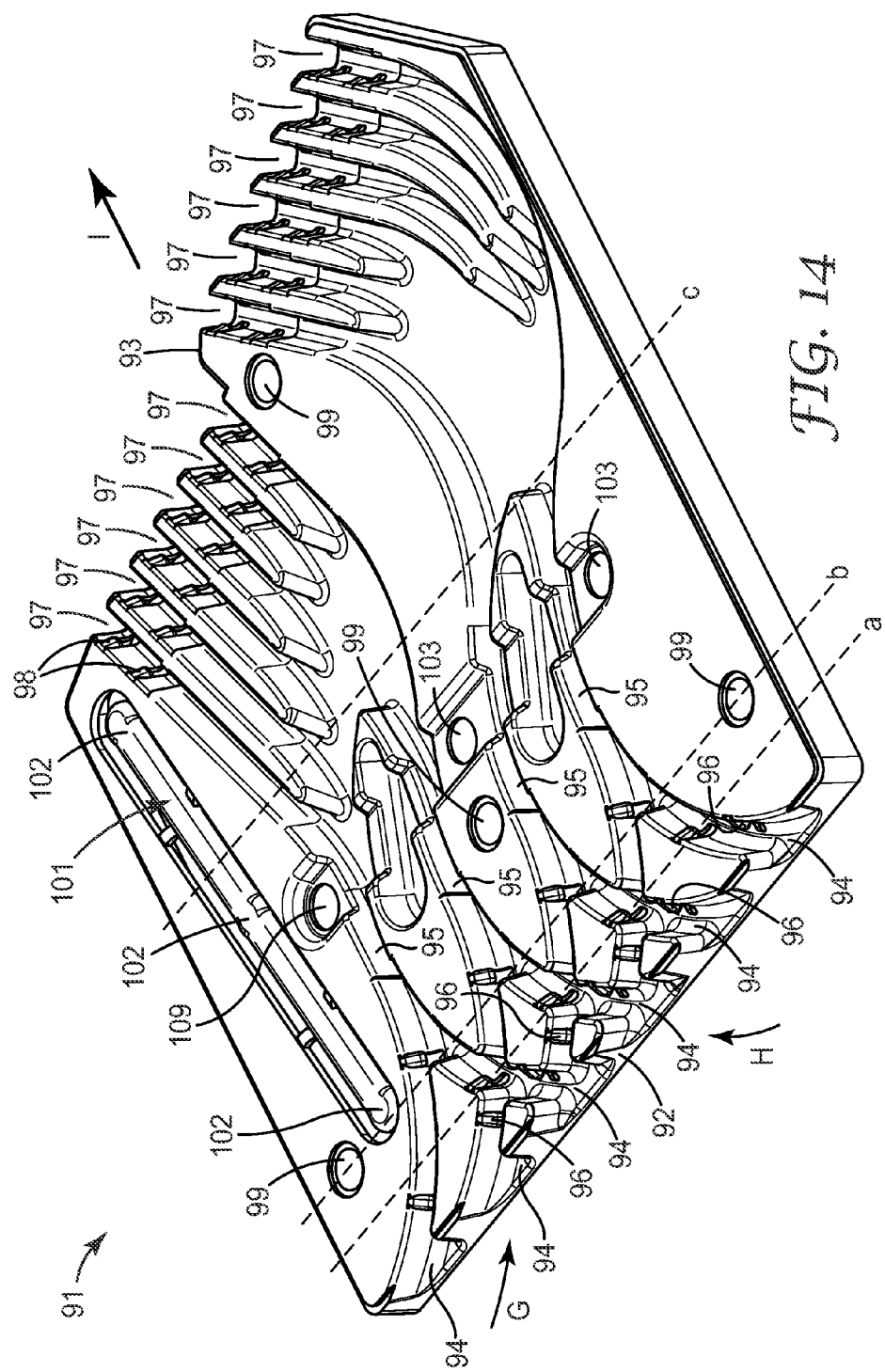
FIG. 14 is a perspective view of a fan out element for fibers entering the optical fiber organizer according to the invention and FIG. 15 is a perspective view of a stack of fan out elements for fibers entering the optical fiber organizer according to the invention on a holder.
Figure 15:
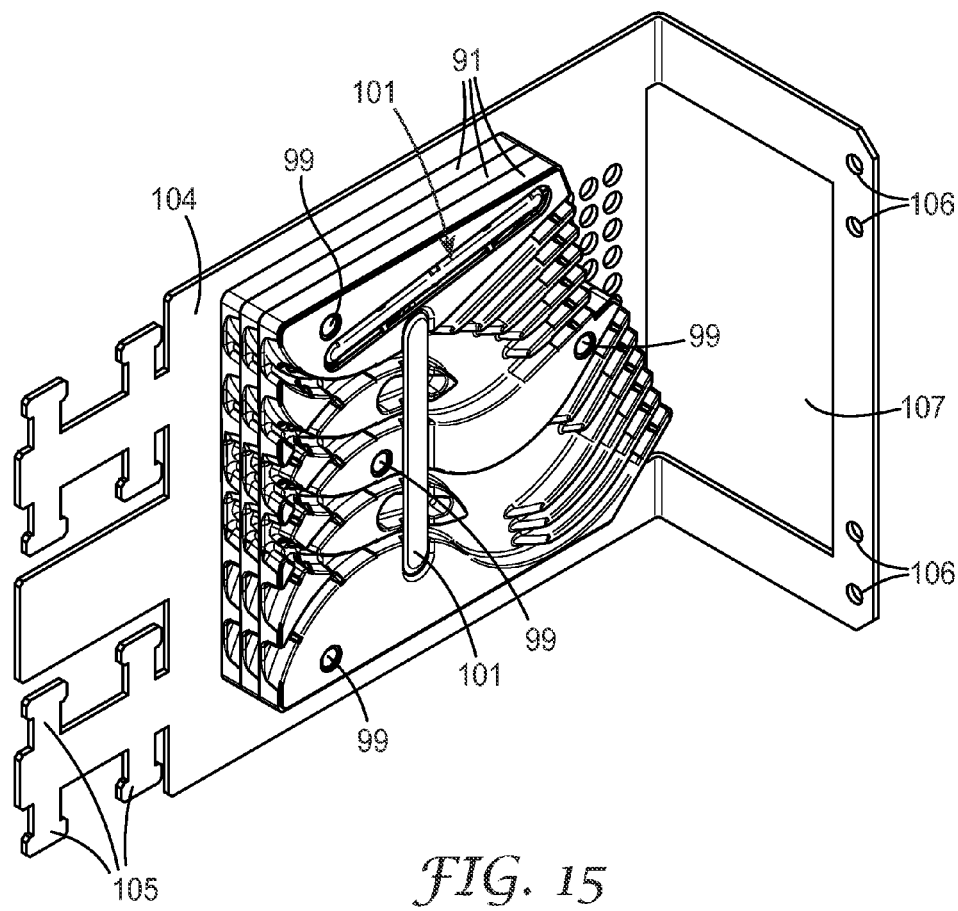

FIG. 14 is a perspective view of a fan out element 91 that is located next to the opening through which fibers enter the optical fiber organizer 1 (see FIG. 1). The fan out element 91 has an essentially flat appearance and is rectangular shaped. FIG. 14 does show the front side of the fan out element 91. On the left side of the fan out element 91 in FIG. 14—the entering or incoming side 92—cable containing several fibers may enter the fan out element 91 either from the direction indicated by the arrow G or from the direction indicated by the arrow H. The fan out element 91 provides several channels 94 for the entering cables—from the direction G and from the direction H, whereby the channels 94 from both directions cross each other at a first reference line a and meet each other at a second reference line b. The channels 94 end up in four essentially parallel channel sections 95 behind the reference line b. Each channel 94 provides means for fixing the cable sheath in the shape of noses 96 such that the fibers may enter the fan out element 91 protected. The channels 94 and 95 are shaped to assure the minimum bend radius of fibers. Behind a third reference line c the fibers may leave their cable sheath and be separated into further channels 97—that lead to the leaving side 93 of the fan out element 91. The channels 97 are oriented such that the incoming fiber directions G and H are approximately perpendicular to the leaving fiber direction indicated by the arrow I. Channels 97 provide means for fixing fiber-tubes through which the separated fibers may be guided from the fan out element 91 into the optical fiber organizer 1 in the shape of two parallel notches 98. The fan out element 91 provides a safe transition between incoming fiber cable and the fiber-tube of the optical fiber organizer 1. The fan out element 91 comprises openings 99 for fixing the fan out element 91 to a holder (see FIG. 15). The openings 99 are configured such that it is possible to stack several single fan out elements 91 as shown in FIG. 14 on top of each other as is shown in FIG. 15. A hold down device 101 is provided as a break out piece at the fan out element 91. After breaking out the hold down device it may be press-fitted with its protrusions 102 into the additional openings 103 of the fan out element 91. The hold down device 101 serves as device for holding down cables in the channel sections 95.

FIG. 15 is a perspective view of a stack of fan out elements for fibers entering the optical fiber organizer 1 according to the invention mounted on a holder 104. The holder 104 is L-shaped. On its short leg it provides an opening 107 for fibers leaving the fan out element 91 and entering the optical fiber organizer 1. It also comprises holes 106 for fixing means for fixing the holder 104 to the housing 2 of the optical fiber organizer 1. On its long leg the holder 104 provides space for a stack of fan out elements 91 (here three of them). They are attached to each other over fixing means (not shown) that may be arranged within the above mentioned openings 99. The above mentioned hold down device 101 is shown in its holding position. The long leg of the holder 104 further provides portions 105 for attaching cables, e.g. with the aid of a cable tie. The holder 104 may be made out of stamped sheet metal.

The invention claimed is:

1. A modular support system for optical fiber trays comprising:
    different modules that may be attached to each other such that the different modules are positioned next to each other so that the modular support system can be adapted to a plurality of applications,
    wherein the modular support system comprises at least one central module for supporting the optical fiber trays, the central module having a rectangular shape with two parallel longer lateral sides and two parallel shorter sides,
    the central module being adapted to be positioned side-by-side with at least one second central module belonging to the modular support system supporting the optical fiber trays by providing recesses and projections on its longer sides cooperating with each other while central modules are positioned side-by-side, and,
    the central module further comprises a fixing structure for attaching at least one additional fiber management module selected from fiber management modules with different kind of fiber management functions to the central module at its shorter sides.

2. The modular support system according to claim 1, wherein the central module comprises a plurality of hooks configured to engage with a latching mechanism of the optical fiber trays.

3. The modular support system according to claim 1, wherein the central module comprises a bearing structure configured to support a pivotal movement of the optical fiber trays relative to the modular support system.

4. The modular support system according to claim 1, wherein the central module comprises a guiding structure configured to direct optical fibers in more than one direction to and from the optical fiber trays.

5. The modular support system according to claim 1, wherein the central module comprises a retaining bracket extending over the lateral sides of the modular support system for retaining optical fibers that are routed to and from the optical fiber trays and that are routed lengthwise to and from the modular support system.

6. The modular support system according to claim 1, wherein the fixing structure of the central module for attaching a fiber management module is positioned on a bottom side of the central module.

7. A kit of parts for a modular support system for optical fiber trays comprising:
    at least one central module for supporting the optical fiber trays,
    the central module having a rectangular shape with two parallel longer sides and two parallel shorter sides, and being adapted to be positioned side-by-side with at least one second additional central module belonging to the modular support system and supporting the optical fiber trays by providing recesses and projections on its longer sides cooperating with each other while central modules are positioned side-by-side, wherein the central module further comprises fixing structures for attaching at least one additional fiber management module selected from fiber management modules with different kind of fiber management functions to the central module at its shorter sides and at least one additional fiber management module.

8. The kit of parts according to claim 7, wherein the fiber management module comprises a c-shaped fiber corridor for guiding optical fibers.

9. The kit of parts according to claim 7, wherein the fiber corridor is oriented such that optical fibers may be routed lengthwise to the modular support system, wherein each corridor can rout optical fibers to either end of the modular support system and provide optical fibers access to individual splice trays mounted on the modular support system.

10. The kit of parts according to claim 7, wherein the at least one additional fiber management module comprises a strain relief element fixing structure, with parallel sidewalls and snap elements for holding strain relief elements.

11. The kit of parts according to claim 7, wherein the strain relief element fixing structure is configured such that the strain relief elements are positioned in a staggered way on the additional fiber management module.

12. The kit of parts according to claim 7, wherein the fiber management module comprises a flat section carrying a fixing structure corresponding with the fixing structure of the central module for attaching the additional fiber management module to the central module.

13. An optical fiber organizer comprising:

a housing;

a drawer slideable mounted in the housing and a modular support system for optical fiber trays according to claim 1 mounted in the drawer.

14. An optical fiber organizer comprising:

a housing;

a drawer slideable mounted in the housing and a kit of parts for a modular support system for optical fiber trays according to claim 6.

\* \* \* \* \*